(12) United States Patent
Lin et al.

(10) Patent No.: US 7,578,190 B2
(45) Date of Patent: Aug. 25, 2009

(54) SYMMETRICAL DIFFERENTIAL CAPACITIVE SENSOR AND METHOD OF MAKING SAME

(75) Inventors: Yizhen Lin, Gllbert, AZ (US); Marco Fuhrmann, Mesa, AZ (US); Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 35 days.

(21) Appl. No.: 11/833,476

(22) Filed: Aug. 3, 2007

(65) Prior Publication Data

US 2009/0031809 A1 Feb. 5, 2009

(51) Int. Cl.
*G01P 15/00* (2006.01)
*G01P 15/125* (2006.01)

(52) U.S. Cl. .................. 73/514.29; 73/514.32
(58) Field of Classification Search ............. 73/514.32, 73/514.29, 514.16, 514.36, 514.38, 514.21, 73/514.17, 514.18
See application file for complete search history.

(56) References Cited

U.S. PATENT DOCUMENTS

| | | | |
|---|---|---|---|
| 5,404,749 A * | 4/1995 | Spangler | 73/514.29 |
| 6,230,566 B1 | 5/2001 | Lee et al. | |
| 6,428,713 B1 | 8/2002 | Christenson et al. | |
| 6,571,628 B1 | 6/2003 | Miao et al. | |
| 6,666,092 B2 | 12/2003 | Zarabadi et al. | |
| 6,935,175 B2 * | 8/2005 | Eskridge et al. | 73/514.32 |
| 6,955,086 B2 * | 10/2005 | Yoshikawa et al. | 73/514.32 |
| 7,005,193 B2 | 2/2006 | McNeil et al. | |
| 7,059,190 B2 * | 6/2006 | Sakai et al. | 73/514.32 |
| 7,140,250 B2 * | 11/2006 | Leonardson et al. | 73/504.14 |
| 7,225,675 B2 * | 6/2007 | Kato et al. | 73/514.32 |
| 2005/0202585 A1 | 9/2005 | Eskridge | |
| 2007/0000323 A1 * | 1/2007 | Kuisma | 73/514.32 |

OTHER PUBLICATIONS

International Search Report and Written Opinion correlating to PCT/US2008/068080, dated Jan. 13, 2009.

* cited by examiner

*Primary Examiner*—Helen C. Kwok
(74) *Attorney, Agent, or Firm*—Meschkow & Gresham PLC

(57) ABSTRACT

A symmetrical differential capacitive sensor (60) includes a movable element (66) pivotable about a geometrically centered rotational axis (70). The element (66) includes sections (86, 88). Each of the sections (86, 88) has a stop (94, 96) spaced equally away from the rotational axis (70). Each of the sections (86, 88) also has a different configuration (104, 108) of apertures (102, 106). The configurations (104, 108) of apertures (102, 106) create a mass imbalance between the sections (86, 88) so that the element (66) pivots about the rotational axis (70) in response to acceleration. The apertures (102, 106) also facilitate etch release during manufacturing and reduce air damping when the element (66) rotates. Apertures (126, 128) are formed in electrodes (78, 80) underlying the apertures (102, 106) to match the capacitance between the two sections (86, 88) of movable element (86) to provide the same bi-directional actuation capability.

16 Claims, 4 Drawing Sheets

174

SYMMETRICAL DIFFERENTIAL CAPACITIVE SENSOR AND METHOD OF MAKING SAME

TECHNICAL FIELD OF THE INVENTION

The present invention relates generally to micro electromechanical systems (MEMS) sensors. More specifically, the present invention relates to a MEMS symmetrical differential capacitive accelerometer.

BACKGROUND OF THE INVENTION

An accelerometer is a sensor typically utilized for measuring acceleration forces. These forces may be static, like the constant force of gravity, or they can be dynamic, caused by moving or vibrating the accelerometer. An accelerometer may sense acceleration or other phenomena along one, two, or three axes or directions. From this information, the movement or orientation of the device in which the accelerometer is installed can be ascertained. Accelerometers are used in inertial guidance systems, in airbag deployment systems in vehicles, in protection systems for a variety of devices, and many other scientific and engineering systems.

Capacitive-sensing MEMS accelerometer designs are highly desirable for operation in high gravity environments and in miniaturized devices, and due to their relatively low cost. Capacitive accelerometers sense a change in electrical capacitance, with respect to acceleration, to vary the output of an energized circuit. One common form of accelerometer is a two layer capacitive transducer having a "teeter-totter" or "see saw" configuration. This commonly utilized transducer type uses a movable element or plate that rotates under z-axis acceleration above a substrate. The accelerometer structure can measure two distinct capacitances to determine differential or relative capacitance.

FIG. 1 shows a side view of a prior art asymmetric capacitive accelerometer 20 constructed as a conventional hinged or "teeter-totter" type sensor. Capacitive accelerometer 20 includes a static substrate 22 having metal electrode elements 24 and 26 of a predetermined configuration deposited on the surface to form respective capacitor electrodes or "plates." A movable element 28, commonly referred to as a "proof mass," is flexibly suspended above substrate 22 by a torsional suspension element 30 and rotates about a rotational axis, represented by a bi-directional arrow 32. A section 34 of movable element 28 on one side of rotational axis 32 is formed with relatively greater mass than a section 36 of movable element 28 on the other side of rotational axis 32. The greater mass of section 34 is typically created by offsetting rotational axis 32 from a geometric center 38 of movable element 28. Due to the differing masses on either side of rotational axis 32, movable element 28 pivots or rotates in response to acceleration, thus changing its position relative to the static sense electrodes 24 and 26. This change in position results in a change in electrical capacitance between movable element 28 and each of electrodes 24 and 26. Capacitors 40 and 42 shown in FIG. 1 represent this capacitance, or more particularly the change in capacitance, as movable element 28 pivots in response to acceleration. The difference between the capacitance, i.e., a differential capacitance, is indicative of acceleration. It should be understood that capacitors 40 and 42 are symbolic of this capacitance, and are not physical components of accelerometer 20.

When accelerometer 20 is subjected to high acceleration, movable element 28 can rotate and contact substrate 22, and thus be prevented from further rotation. This stopping feature is useful for avoiding structural failure of movable element 28 and/or to avoid shorting in either of capacitors 40 and 42. In some embodiments, a stop or post structure 44 may be implemented on opposing longitudinal ends 46 of movable element 28 as the stop feature. The relatively small surface area of stops 44 largely prevents movable element 28 from becoming stuck to the underlying electrodes and/or substrate. That is, without stops 44, the larger surface area of movable element 28 may become stuck to the underlying electrodes and/or substrate thereby rendering accelerometer 20 unusable.

FIG. 2 shows a chart of an exemplary output signal 46 of the asymmetric accelerometer 20 (FIG. 1) under sinusoidal excitation. Due to its asymmetrical configuration and the asymmetrical placement of stops 44, movable element 28 stops at a different acceleration amplitude between the positive and negative direction. The stop results in clipping at a positive acceleration value 48 that differs from the clipping at a negative acceleration value 50. This creates a non-zero time-averaged output value 52 in the overload response. A time-averaged output value of a sinusoidal excitation should be zero, so non-zero value 52 can cause inaccuracies in acceleration measurements, and possible malfunction of the device into which accelerometer 20 is incorporated.

Referring back to FIG. 1, sometimes an actuation electrode (not shown) is disposed on substrate 22 below section 34 of movable element 28 and beside electrode 24. Such an actuation electrode can be used for self-test activities. Unfortunately, the use of a single actuation electrode on one side of rotational axis 32 only allows for self-test in a single direction. Some methodologies call for actuation in both directions, i.e., a bi-directional self-test. With the asymmetric configuration of accelerometer 20, one technique for enabling bi-directional self-test is to reduce the effective areas of both of electrodes 24 and 26 and utilize some of that area for an additional pair of actuation electrodes. Unfortunately, the loss of area of electrodes 24 and 26 can result in accelerometer performance degradation.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

Figure 1:
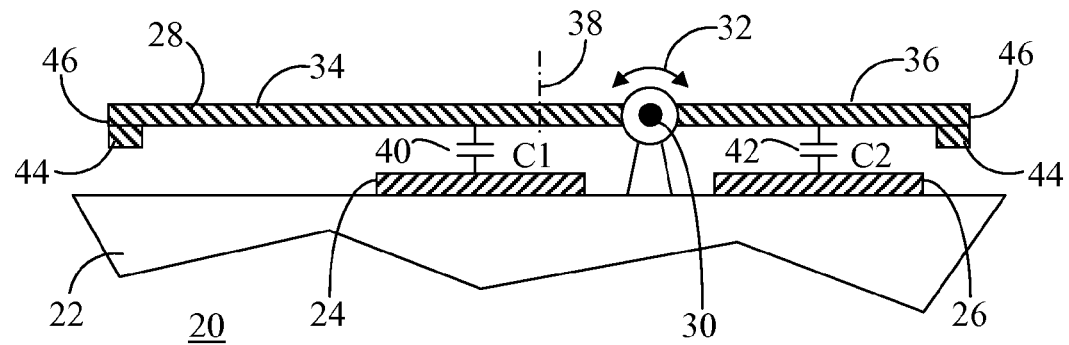
FIG. 1 shows a side view of a prior art asymmetric capacitive accelerometer constructed as a conventional hinged or "teeter-totter" type sensor.
Figure 2:
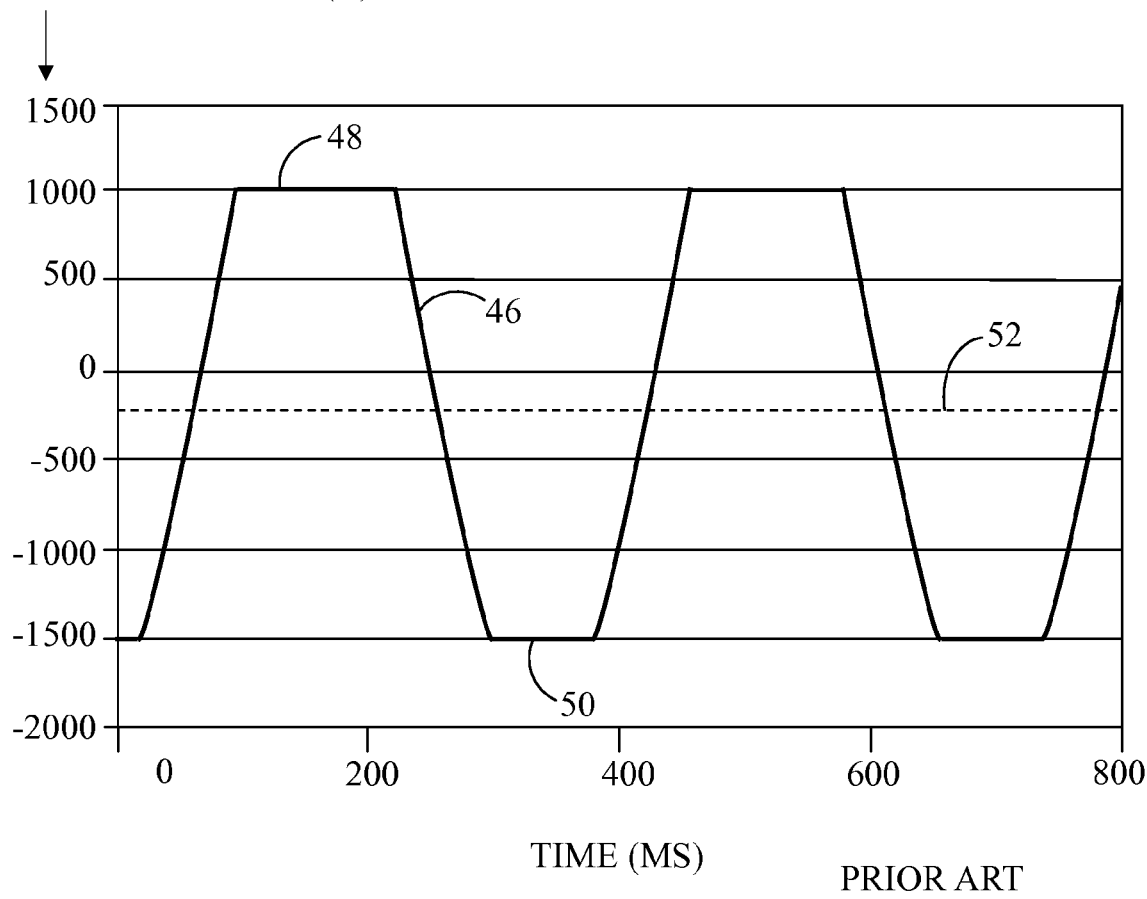
FIG. 2 shows a chart of an exemplary output signal of the asymmetric accelerometer of FIG. 1 under sinusoidal excitation.
Figure 3:
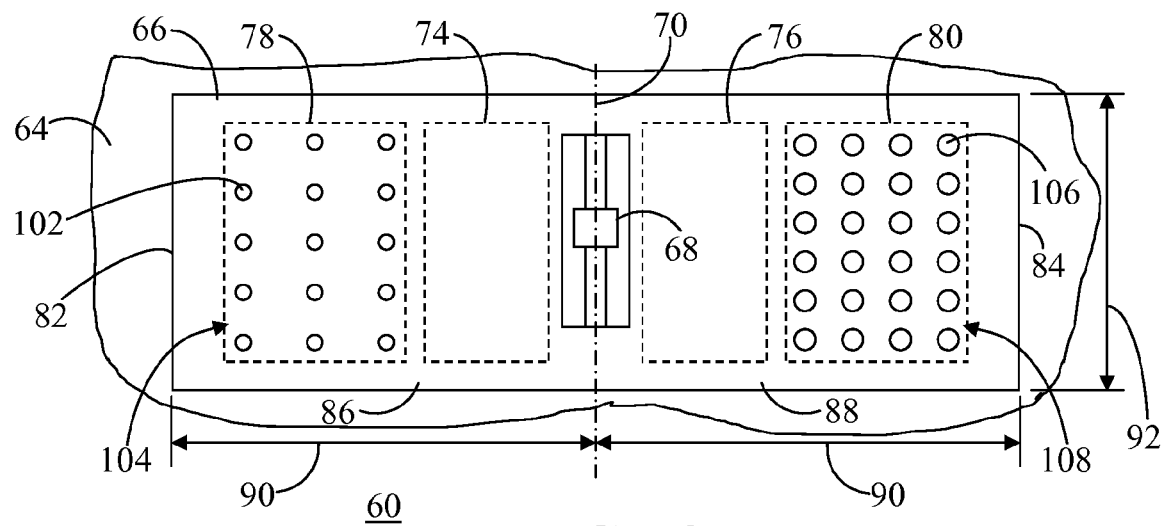
FIG. 3 shows a top view of a symmetric differential capacitive sensor in accordance with the present invention.
Figure 4:
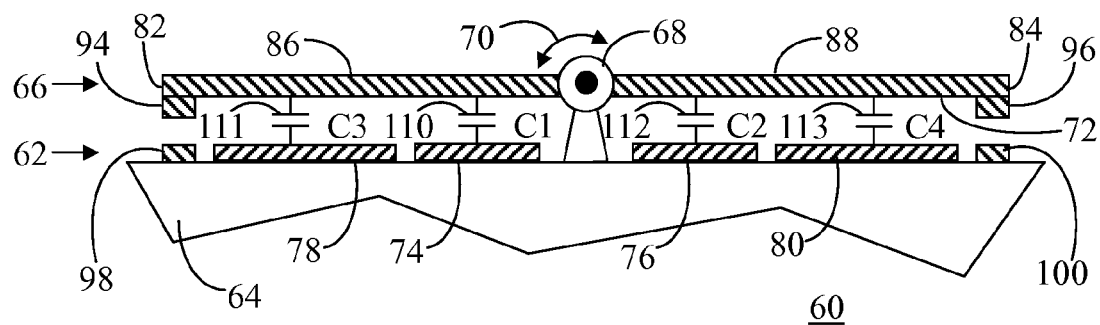
FIG. 4 shows a side view of the symmetric differential capacitive sensor of FIG. 3.

Referring to FIGS. 3 and 4, FIG. 3 shows a perspective view of a symmetric differential capacitive sensor 60 in accordance with the present invention and FIG. 4 shows a side view of the symmetric differential capacitive sensor 60. Sensor 60 may be, for example, a Micro Electro-Mechanical Systems (MEMS) accelerometer or other MEMS sensing device. For purposes of the following discussion, sensor 60 is referred to hereinafter as capacitive accelerometer 60. Capacitive accelerometer 60 is in a geometrically symmetric teeter-totter configuration that eliminates the non-zero time-averaged output value caused by asymmetric clipping, optimizes the utilization of die area to provide better sensing, and allows for sufficient electrostatic actuation that may be used for bi-directional self test and/or for a "closed loop" or feedback design.

Capacitive accelerometer 60 includes a static conductive layer 62 disposed on a substrate 64. Another conductive layer, referred to herein as a movable sense element 66 is formed above conductive layer 62. Movable sense element 66 is supported by a hinge element 68 and is allowed to pivot about a rotational axis 70 defined by hinge element 68. It should be understood that a number of flexures, hinges, and other rotational mechanisms may be utilized to enable pivotal movement of movable sense element 66 about rotational axis 70.

Static conductive layer 62 includes at least one electrode in the form of four electrodes or plates positioned on substrate 64 and facing a surface 72 of movable element 66. These electrodes include a sense electrode 74 electrically isolated from another sense electrode 76, and an actuation electrode 78 electrically isolated from a actuation electrode 80. Sense electrodes 74 and 76 and actuation electrodes 78 and 80 underlie movable element 66. Accordingly, in the top view of FIG. 3 in which the electrodes would not normally be visible, electrodes 74, 76, 78, and 80 are represented by dashed lines to illustrate their locations relative to movable element 66 and rotational axis 70.

As mentioned briefly above, capacitive accelerometer 60 is in a geometrically symmetric teeter-totter configuration. To that end, hinge element 68 is positioned such that rotational axis 70 is substantially geometrically centered between ends 82 and 84 of movable element 66. A section 86 is formed between rotational axis 70 and end 82 and a section 88 is formed between rotational axis 70 and end 84. In terms of the overall geometry, a length 90 from end 82 and rotational axis 70 is substantially equivalent to length 90 between end 84 and rotational axis 70. Movable element 66 is substantially rectangular. Accordingly, a width 92 of each of sections 86 and 88 is also substantially equivalent.

Stops 94 and 96 extend from surface 72 of movable element 66 at ends 82 and 84, respectively, toward substrate 64. Pivotal motion of movable element 66 is stopped when stops 94 and 96 contact corresponding dedicated contact plates 98 and 100 disposed on substrate 64 and kept at the same potential as stops 94 and 96. Stops 94 and 96 are displaced an equivalent distance from rotational axis 70. Accordingly, movable element 66 is stopped at substantially the same amplitude of acceleration in both the positive and negative direction. As a result, the non-zero time-averaged output value caused by asymmetrical clipping in prior art designs is eliminated.

A moment, or tendency to produce motion about rotational axis 70, on movable element 66 needs to be created in order for capacitive accelerometer 60 to perform its sensing function. This is accomplished by forming apertures extending through movable element 66 in each of sections 86 and 88 that are different in size and/or quantity. For example, apertures 102 in section 86 are arranged in a configuration 104, and apertures 106 in section 88 are arranged in a configuration 108. Configurations 104 and 108 describe a size and quantity of corresponding ones of apertures 102 and 106 in respective sections 86 and 88. For example, apertures 102 in configuration 104 are smaller in diameter and fewer than apertures 106 of configuration 108.

By placing smaller and/or fewer apertures 102 in section 86 and larger and more apertures 106 in section 88, an imbalance of mass, with respect to rotational axis 70, is created. This imbalance of mass is effectively augmented by positioning apertures 102 and 106 distal from rotational axis 70 thereby increasing the moment arm of movable element 66. In this scenario, section 88 has less mass than section 86. Due to this imbalance, a moment is produced by the input acceleration to pivot movable element 66 about rotational axis 70. The sensing function is therefore realized by detecting the differential capacitance signal between a capacitor 110 and a capacitor 112 formed between corresponding sense electrodes 74 and 76 and movable element 66. In addition, an actuation function is realized by a capacitor 111 formed between actuation electrode 78 and movable element 66 and a capacitor 113 is formed between actuation electrode 80 and movable element 66. Although two configurations 104 and 108 are shown, it should be apparent that variations in size and quantity of apertures 102 and 106 can be arrived at that cause an imbalanced movable element 66 with respect to rotational axis 70.

Apertures 102 and 106 are additionally useful for optimizing the damping effect of air when movable element 66 pivots. A damper is an entity that regulates the amplitude of mechanical, acoustical, electronic, or aerodynamic oscillations. Air trapped between movable element 66 and substrate 64 acts as a damper and can result in undesirably high damping. Undesirably high damping can cause movable element 66 to respond too slowly, especially for large accelerations. Conversely, if an insufficient volume of air is trapped between movable element 66 and substrate 64, movable element 66 may oscillate too much leading to acceleration measurement inaccuracies and overloading. Apertures 102 and 106 allow for escape of some air between movable element 66 and the underlying structures to appropriately control the air damping effect.

Figure 5:
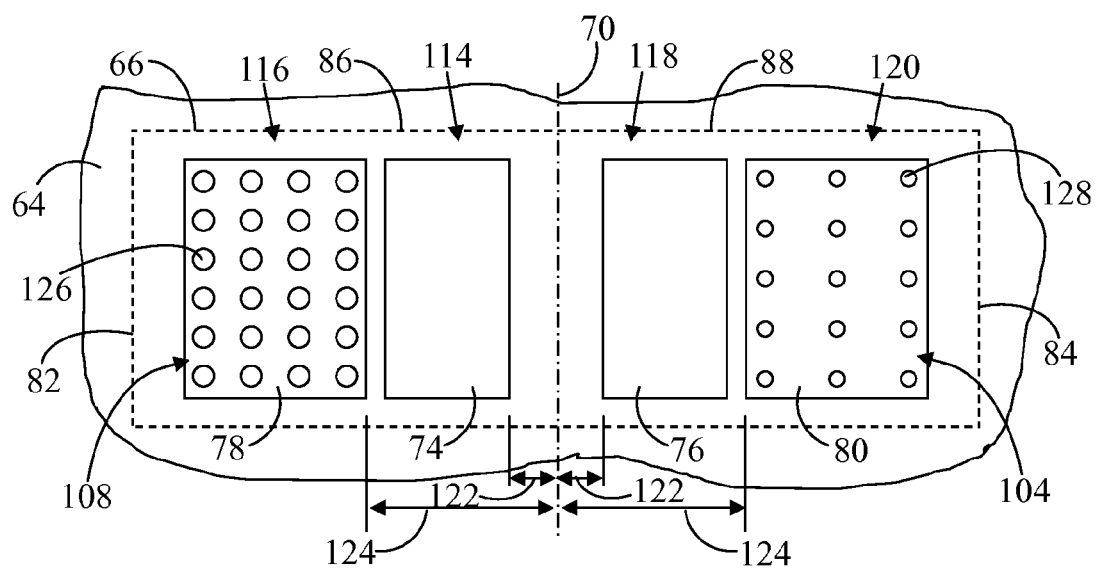
FIG. 5 shows a top view of electrodes disposed on a substrate of the sensor of FIG. 3.

FIG. 5 shows a top view of electrodes 74, 76, 78, and 80 disposed on substrate 64 of capacitive accelerometer 60. In the top view of FIG. 5, movable element 66 is represented by dashed lines to illustrate its location relative to electrodes 74, 76, 78, and 80. In general, section 86 can be characterized as having a proximal region 114 located adjacent rotational axis 70 and a distal region 116 located adjacent end 82. Likewise, section 88 can be characterized as having a proximal region 118 located adjacent rotational axis 70 and a distal region 120 located adjacent end 84.

In an embodiment, sense electrode 74 faces proximal region 114 of section 86 and sense electrode 76 faces proximal region 118 of section 88. More significantly, sense electrodes 74 and 76 are symmetrically arranged relative to rotational axis 70 so that a distance 122 between each of electrodes 74 and 76 and rotational axis 70 is substantially equal. Actuation electrode 78 faces distal region 116 of section 86 and actuation electrode 80 face distal region 120 of section 88. Like electrodes 74 and 76, actuation electrodes 78 and 80 are symmetrically arranged relative to rotational axis 70 so that a distance 124 between each of electrodes 78 and 80 and rotational axis 70 is substantially equal.

Actuation electrode 78 has apertures 126 arranged in configuration 108, like apertures 106 (FIG. 3) in section 88 of movable element 66. In addition, actuation electrode 80 has apertures 128 arranged in configuration 104, like apertures 102 (FIG. 3) in section 86 of movable element 66. The symmetrical placement of electrodes 74, 76 yields a matched capacitance, i.e., an equal and opposite capacitance, between capacitors 110 and 112 (FIG. 4). This provides equivalent sensing capability of sense electrodes 74, 76 in both directions. The symmetrical placement of electrodes 78, 80 as well as the "mirror image" or flipped symmetry of apertures 126 relative to apertures 106 and apertures 128 relative to apertures 102 yields a matched capacitance between capacitors 111 and 113 (FIG. 4). This provides equivalent actuation capability of actuation electrodes 78, 80 in both directions.

When bias is applied between either of actuation electrodes 78 and 80 and movable element 66, an electrostatic force can be effectively produced to provide the actuating function. The net surface area of distal region 116 of section 86 of movable element 66 is different than the net area of distal region 120 of section 88 of movable element 66. In this scenario, configuration 104 (FIG. 3) includes apertures 102 that are smaller and fewer in quantity than configuration 108 (FIG. 3). Consequently, the net surface area of the remaining movable element 66 in distal region 116 of section 86 is greater than the net surface area of the remaining movable element 66 in distal region 120 of section 88.

A fringing electrical field describes the flux of electric field due to perimeter size. That is, the electric field concentrates at edges, such as at the perimeter of each of apertures 102 and 106 (FIG. 3). Due to this fringing electrical field, the capacitance between electrodes 78 and 80 and movable element 66 can still be matched to a reasonable degree between sections 86 and 88, hence also providing equivalent actuating capability at actuation electrodes 78 and 80 in both directions.

Actuation electrodes 78 and 80, respectively, advantageously provide actuation for "self test" operation and/or for feedback "closed-loop" operation. For "self test" operation they can provide a large amount of actuation to test the function of differential accelerometer 60. For feedback operation, they provide ability to counteract large acceleration. Thus, in feedback operation, a feedback signal can be applied to actuation electrodes 78 and 80 to sense the position of movable element 66 with capacitance and provide electrostatic bias to the actuation electrodes to keep the movable element stationary, or to restrict movement in certain frequency ranges. For example, movement may be restricted to allow high frequency movement but to counteract low-frequency movement, such as any temperature and/or time dependent offset caused by package stress. Consequently, the symmetrical teeter-totter design of capacitive accelerometer 60 further provides effective bi-directional actuation for self-test, feedback, offset cancellation, and so forth.

It should be noted that the combination of electrodes 74 and 78 substantially underlies the entirety of section 86 of movable element 66. Similarly, the combination of electrodes 76 and 80 substantially underlies the entirety of section 88 of movable element 66. This configuration results in an efficient use of an entirety of the surface area of movable element 66 as contrasted with prior art non-symmetrical proof mass configurations having an unused shield area. Moreover, this configuration allows for an optimally dimensioned proof mass, i.e., movable element 66, while enabling significant capacitive output of capacitors 110 and 112 and allowing for a sufficient actuation voltage at actuation electrodes 78 and 80.

Figure 6:
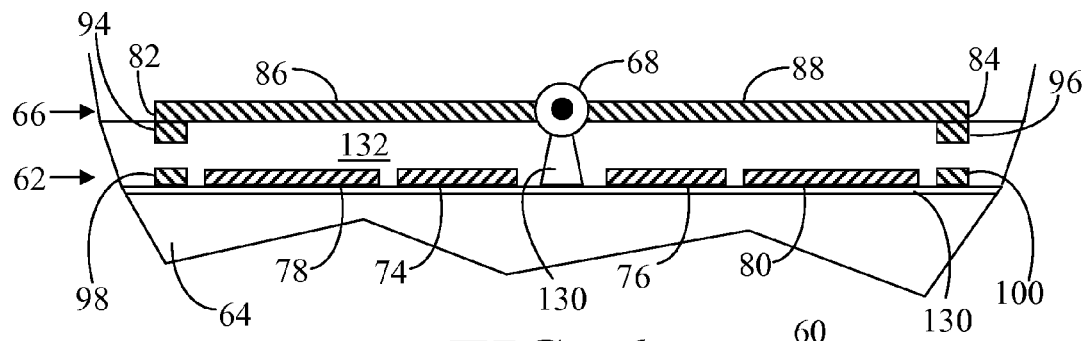
FIG. 6 shows a side view of the differential capacitive sensor during processing in accordance with the present invention.

FIG. 6 shows a side view of differential capacitive sensor 60 during processing in accordance with the present invention. Substrate 64 may be a semiconductor wafer comprising silicon, although any mechanically supporting substrate may be utilized. In accordance with conventional manufacturing practices, an insulating layer 130 may be formed on the surface of substrate 64 if substrate 64 is nonconductive. Static conductive layer 62 may comprises polysilicon, although other conductive materials may be employed. Conductive layer 62 may be formed by known methods such as deposition and sputtering. For example, conductive layer 62 may be deposited over the surface of substrate 64 as a blanket layer and can then be patterned and etched to form sense electrodes 74 and 76, and actuation electrodes 78 and 80, having apertures 126 and 128, respectively (FIG. 5). Contact plates 98 and 100 may then be formed on substrate 64. Contact plates 98 and 100 may be formed by known methods and from known materials. A protective layer (not shown) may optionally be disposed over conductive layer 62 and patterned and etched as desired to protect substrate 64 during future processing steps and to prevent shorting and/or welding between conductive layer 62 and movable element 66.

A sacrificial layer 132 is then formed on the patterned and etched conductive layer 62 and contacts 98 and 100. Like previous layers, sacrificial layer 132 can also be formed conformally and then patterned and etched as desired. For example, a contact opening may be formed in sacrificial layer 132 for deposition of a hinge anchor 133 that functions to mechanically attach hinge element 68 to substrate 64. Sacrificial layer 132 is typically silicon oxide and can be deposited by chemical vapor deposition, as known to those skilled in the art. It should be understood that other sacrificial materials may be employed in lieu of silicon oxide, such as phosphosilicate glass or borophosphosilicate glass.

The next conductive layer, i.e., movable element 66 having stops 82 and 84, comprises polysilicon and is formed as a teeter-totter structure positioned over conductive layer 62 by known methodologies. In addition, apertures 102 and apertures 106 (FIG. 3) can be patterned and etched in movable element 66 by known methodologies. In one embodiment, this conductive layer is masked, patterned, and etched in a single process to define the various elements of movable element 66. In the depicted embodiment, these include hinge anchor 133, hinge element 68, movable element 66 with stops 82 and 84, and apertures 102 and 106. Other deposition processes can then be performed that include, for example, deposition of another sacrificial layer over movable element 66, and so forth, as known to those skilled in the art.

Following the formation of the above described structure, sacrificial layer 132 is removed so that movable element 66 is free to pivot. For example, a selective etchant may be employed that can remove the phosphosilicate glass sacrificial layer without appreciably damaging the polysilicon of static conductive layer 62 and movable element 66. Apertures 102 and 106 (FIG. 3) in movable element 66 additionally serve a useful function during the manufacturing of capacitive accelerometer 60. The etchant may be applied to sacrificial layers 132 through apertures 102 and 106. This effectively increases etchant propagation thereby facilitating sacrificial layer 132 etch during manufacturing and the subsequent release of movable element 66 from the underlying structures.

Figure 7:
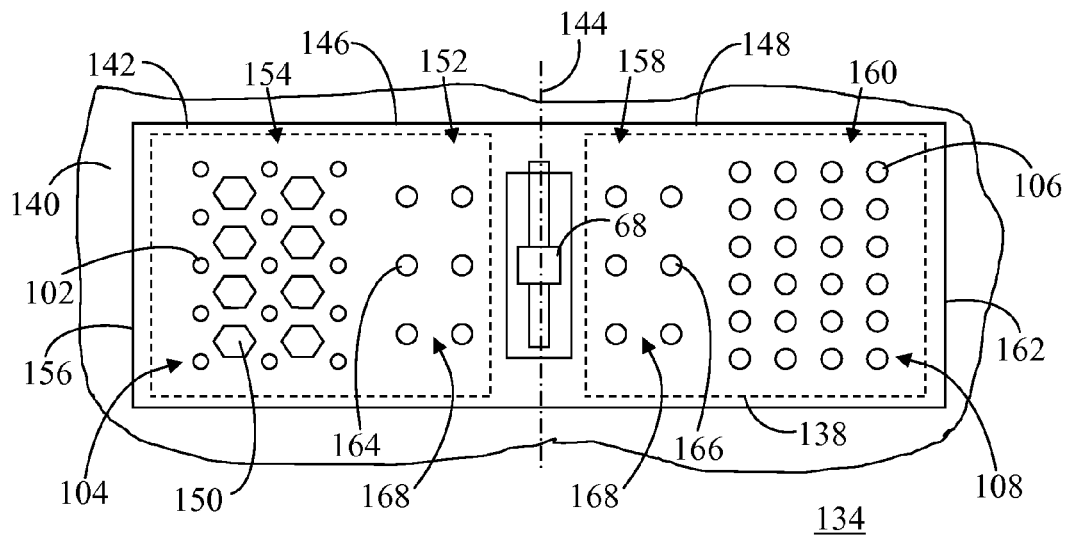
FIG. 7 shows a top view of a symmetric differential capacitive sensor in accordance with another embodiment of the present invention.
Figure 8:
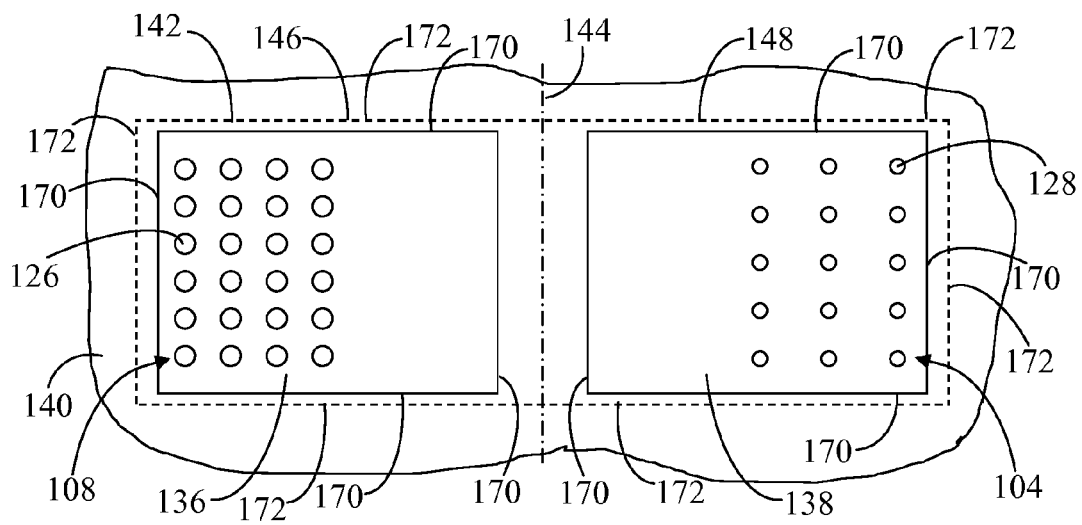
FIG. 8 shows a top view of electrodes disposed on a substrate of the sensor of FIG. 7.

Referring to FIGS. 7-8, FIG. 7 shows a top view of a symmetric differential capacitive sensor 134 in accordance with another embodiment of the present invention, and FIG. 8 shows a top view of electrodes 136 and 138 disposed on a substrate 140 of sensor 134. It should be noted that electrodes 136 and 138 underlie movable element 142. Accordingly, in the top view of FIG. 7, electrodes 136 and 138 are represented by dashed lines to illustrate their locations relative to a geometrically centered rotational axis 144 of movable element 142. In addition, movable element 142 is represented by dashed lines in the top view of FIG. 8 to illustrate its location relative to electrodes 136 and 138.

Capacitive sensor 134 includes several features of capacitive accelerometer 60, such as a movable element 142 that includes apertures 102 arranged in configuration 104 and apertures 106 arranged in configuration 108, and hinge element 68. In addition, electrode 136 includes apertures 126 arranged in configuration 108, and apertures 138 include apertures 128 arranged in configuration 106. Electrodes 136 and 138 are also symmetrically arranged relative to rotational axis 144. These features are discussed above in connection with FIGS. 3-5 and their descriptions and advantages are not repeated herein for brevity.

Movable element 142 of sensor 134 includes a section 146 and a section 148 defining opposing halves of element 142 delineated by rotational axis 144. A material 150 is disposed on section 146 of movable element 142 in the proximity of configuration 104 of apertures 102. Material 150 may be, for example, a metal or other material disposed on section 146 of movable element 142. Material 150 may be deposited and patterned per known processes. Material 150 functions to further increase the mass of section 146 of movable element 142 relative to section 148 so as to create a greater imbalance between sections 146 and 148. As a result, the sensitivity of sensor 134 can be increased without having to change the torsional spring constant or without increasing sensor size.

In general, section 146 of movable element 142 can be characterized as having a proximal region 152 located adjacent rotational axis 144 and a distal region 154 located adjacent an end 156 of movable element 142. Likewise, section 148 can be characterized as having a proximal region 158 located adjacent rotational axis 144 and a distal region 160 located adjacent an end 162. Movable element 142 includes apertures 164 extending through proximal region 152 of section 146, and apertures 166 extending through proximal region 158 of section 148. Each of apertures 162 and 164 are arranged in a common configuration 168 defining a quantity and size of apertures 164 and 166. Apertures 164 and 166 are also symmetrically located on opposing sides of rotational axis 144. Apertures 164 and 166 do not function to create a mass imbalance between sections 146 and 148, hence their common configuration 168 and symmetrical placement relative to rotational axis 144. Rather, apertures 164 and 166 facilitate etch release between movable element 142 and the underlying structures closest to rotational axis 144.

In the embodiment of FIGS. 7-8, electrode 136 faces section 146 of movable element 142 and electrode 138 faces section 148 of movable element 142. Each of electrodes 136 and 138 has an outer perimeter 170 that is made as large as possible. For example, perimeter 170 of each of electrodes 136 and 138 is approximately equivalent to an outer perimeter 172 of their respective overlying sections 146 and 148. Each of electrodes 136 and 138 serve combined functions. That is, each of electrodes 136 and 138 serves both a sensing function and an actuation function. In an exemplary scenario, the single set of electrode elements 136 and 138 operates as both sensing and actuation or feedback electrodes when the actuation or feedback signal is superimposed on the sensing signal, while efficiently utilizing an entirety of the surface area of movable element 66. This electrode configuration effectively improves both sensing and actuation capability.

Figure 9:
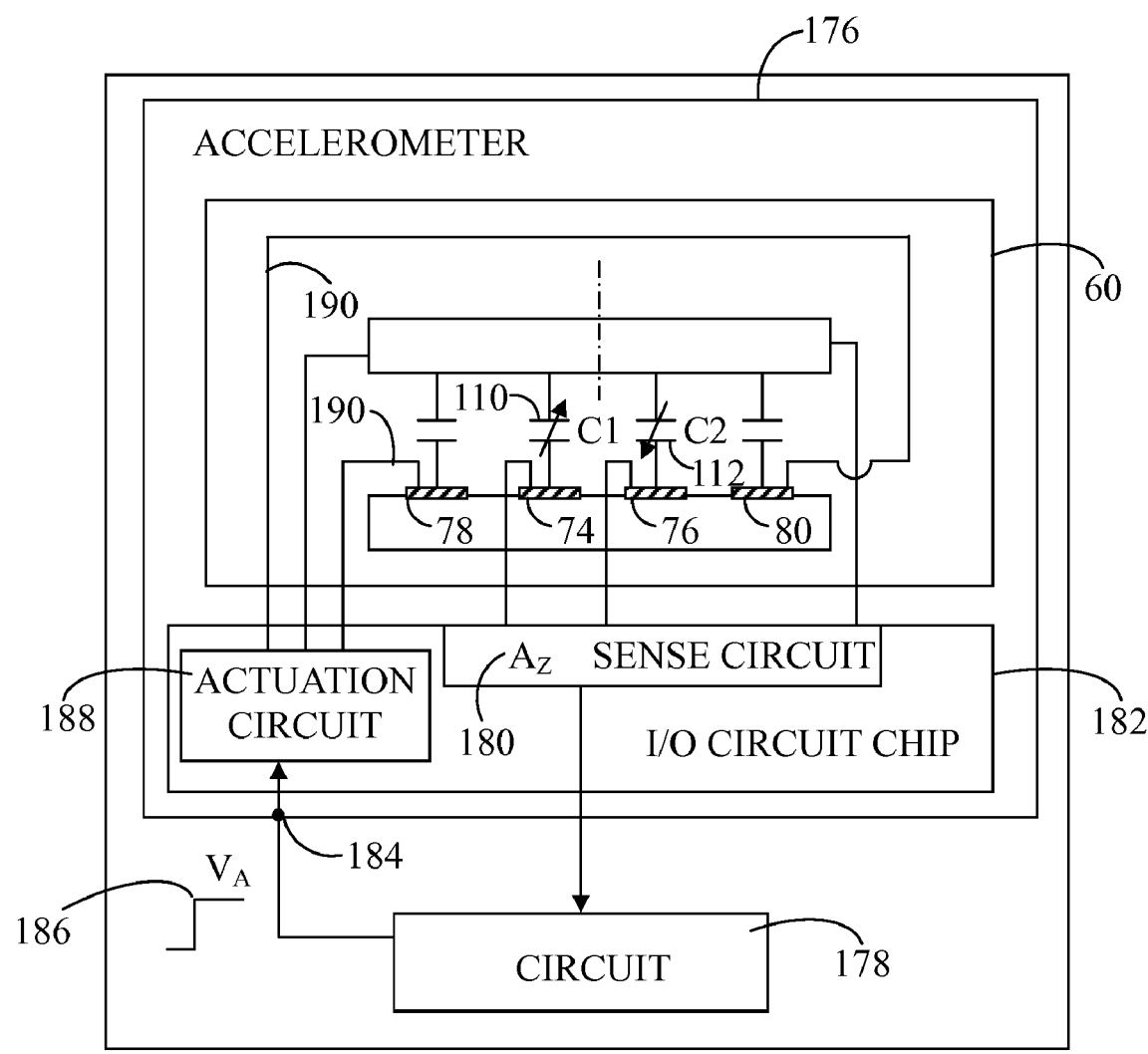
FIG. 9 shows a device in which the differential capacitive sensor may be installed.

FIG. 9 shows a device 174 in which differential accelerometer 60 may be installed. Although device 174 is shown with differential accelerometer 60 installed therein, another embodiment of device 174 may have differential accelerometer 134 (FIG. 7) installed therein. Device 174 can be any of a number of devices such as an inertial guidance system, an airbag deployment system in a vehicle, a protection system for a variety of devices, and many other scientific and engineering systems. Device 174 includes an accelerometer package 176 into which differential accelerometer 60 is incorporated. In this exemplary situation, accelerometer package 176 is in communication with a circuit 178, which may include, for example, a processor, hard disk drive, and other components that are interconnected via conventional bus structures known to those skilled in the art. Those skilled in the art will recognize that device 174 may include many other components that are not discussed herein for brevity. Furthermore, device 174 need not have the structures specified herein.

In general, circuit 178 monitors signals from accelerometer package 176. These signals include acceleration along the Z axis. Differential accelerometer 60 of accelerometer package 176 senses a Z axis acceleration ($A_z$) 180. In accordance with the present invention, Z axis acceleration 180 is produced by capacitances from capacitors 110 and 112 as discussed in connection with FIG. 4. The capacitance signals from differential accelerometer 50 are communicated to a sense circuit of an input/output circuit chip 182 for suitable processing, as known to those skilled in the art, prior to output to circuit 178.

Accelerometer package 176 further includes an actuation voltage input port 184 in communication with circuit 178 for application of a digital input voltage signal 186. Voltage signal 186 signals an actuation circuit 188 of I/O circuit chip 182 to provide an actuation voltage (V+ and V−) 190 at actuation electrodes 78 and/or 80. Circuit 178 may additionally be in communication with a port (not shown) external to device 174 so that an external input signal may be communicated to circuit 178. Processor software or hardware on circuit 178 subsequently generates voltage signal 186, which is conveyed to input port 184.

An embodiment described herein comprises a device that includes a differential capacitive sensor fabricated as a symmetrical teeter-totter structure. Another embodiment comprises a method of fabricating the micro electro-mechanical systems symmetrical differential capacitive sensor of the present invention. Stops extend from the movable element at equal distances from a geometrically centered rotational axis of the teeter-totter proof mass so that the movable element stops at the same amplitude of acceleration in both positive and negative directions. As a result, the non-zero time-averaged output value caused by asymmetrical clipping is eliminated. In addition, multiple apertures are placed in each of the distal portions of the movable proof mass. The apertures on one side of the rotational axis are of a different size and/or quantity than the apertures on the other side of the rotational axis thus creating a mass imbalance between the opposing halves of the proof mass. Moreover, the apertures on either side of the rotational axis are positioned distal from the rotational axis of the movable element to create a large moment arm of the movable element. This enables rotation of the movable proof mass element in response to acceleration in the Z-axis. Additional material, such as metal can be disposed on the heavy side of the movable proof mass to further increase its mass. The apertures in the proof mass also facilitate sacrificial oxide etch during sensor manufacturing, and the apertures effectively reduce the air damping when the movable proof mass pivots. Actuation electrodes are placed at equal distances that are distal from the geometrically centered rotational axis of the teeter-totter proof mass structure so that relatively large sense electrodes can be clustered proximate the rotational axis. Electrodes underlying the apertures in the movable mass are formed to include corresponding "mirror image" apertures so that the capacitance between the actuation electrodes and the movable proof mass can be matched between the heavy and light ends to provide the same actuation capability. The configuration of sense electrodes and actuation electrodes allows for efficient utilization of an entirety of the surface area of the movable element to provide improved sensing and actuation capability.

Although the preferred embodiments of the invention have been illustrated and described in detail, it will be readily apparent to those skilled in the art that various modifications may be made therein without departing from the spirit of the invention or from the scope of the appended claims. For example, the actuation electrodes may be utilized as sense electrodes in applications where no actuation is required. Under such a situation, the amount of capacitance output can be correspondingly increased.

What is claimed is:

1. A device comprising:
    a Micro Electro-Mechanical System (MEMS) sensor, said sensor comprising:
        a substrate;
        a movable sensing element attached to said substrate, said movable element being adapted for motion relative to a rotational axis substantially geometrically centered between first and second ends of said movable sensing element to form a first section between said rotational axis and said first end, said first section having a first shape, and a second section between said rotational axis and said second end, said second section exhibiting a second shape that is substantially equivalent to said first shape such that said movable element is geometrically symmetric relative to said rotational axis, said first section including first apertures extending through said movable element to produce said first section having a first mass, said second section including second apertures extending through said movable element to produce said second section having a second mass that is less than said first mass; and
        at least one electrode positioned on said substrate facing said first and second sections of said movable element.

2. A device as claimed in claim 1 wherein:
    said first apertures are displaced from said rotational axis toward said first end; and
    said second apertures are displaced from said rotational axis towards said second end.

3. A device as claimed in claim 1 wherein:
    said first apertures are arranged in said first section in a first configuration; and
    said second apertures are arranged in said second section in a second configuration, said second configuration differing from said first configuration, and each of said first and second configurations describing a size and a quantity of corresponding ones of said first apertures and said second apertures.

4. A device as claimed in claim 3 wherein said at least one electrode comprises:
    a first electrode facing said first section, said first electrode having third apertures arranged in said second configuration and opposing said first apertures; and
    a second electrode facing said second section, said second electrode having fourth apertures arranged in said first configuration and opposing said second apertures.

5. A device as claimed in claim 3 further comprising wherein said sensor further comprises:
    third apertures extending through said first section; and
    fourth apertures extending through said second section, each of said third and said fourth apertures being arranged in a common configuration defining a quantity and size of said third and fourth apertures, and said third and fourth apertures being substantially symmetrically located on said movable element relative to said rotational axis.

6. A device as claimed in claim 1 wherein:
    said first section comprises a first proximal region located adjacent said rotational axis and a first distal region located adjacent to said first end;
    said second section comprises a second proximal region located adjacent said rotational axis and a second distal region located adjacent to said second end; and
    said at least one electrode comprises a first sense electrode facing said first proximal region and a second sense electrode facing said second proximal region, said first and second sense electrodes being substantially symmetrically arranged relative to said rotational axis.

7. A device as claimed in claim 6 wherein said at least one electrode further comprises:
    a first actuation electrode facing said first distal region; and
    a second actuation electrode facing said second distal region, said first and second actuation electrodes being substantially symmetrically arranged relative to said rotational axis.

8. A device as claimed in claim 1 wherein said at least one electrode comprises:
    a first electrode facing said first section and having a first perimeter that is approximately equivalent to a first outer perimeter of said first section; and
    a second electrode facing said second section and having a second perimeter that is approximately equivalent to a second outer perimeter of said second section.

9. A device as claimed in claim 8 wherein:
    said first electrode includes third apertures opposing said first apertures in said first section; and
    said second electrode includes fourth apertures opposing said second apertures in said second section.

10. A device as claimed in claim 1 further comprising a material disposed on said first section of said proof mass, said material increasing said first mass of said first section relative to said second mass.

11. A device as claimed in claim 1 wherein said sensor further comprises:
    a first stop extending from a surface of said movable element proximate said first end, said surface facing said substrate; and
    a second stop extending from said surface of said movable element proximate said second end, each of said first and second stops being displaced a substantially equivalent distance from said rotational axis.

12. A device as claimed in claim 11 wherein said substrate comprises:
    a first contact plate facing said movable sensing element, said first stop being selectively contactable with said first contact plate; and
    a second contact plate facing said movable sensing element, said second stop being selectively contactable with said second contact plate, and said first and second stops being at a substantially equivalent potential as said first and second contact plates.

13. A Micro Electro-Mechanical System (MEMS) sensor comprising:
- a substrate;
- a movable sensing element attached to said substrate, said element being adapted for motion relative to a rotational axis substantially geometrically centered between first and second ends of said movable sensing element to form a first section between said rotational axis, said first section having a first shape, and said first end and a second section between said rotational axis and said second end, said second section having a second shape that is substantially equivalent to said first shape such that said movable element is geometrically symmetric relative to said rotational axis, said first section including first apertures extending through said movable element to produce said first section having a first mass, said second section including second apertures extending through said movable element to produce said second section having a second mass that is less than said first mass, said first apertures are arranged in said first section in a first configuration, said second apertures are arranged in said second section in a second configuration, said second configuration differing from said first configuration, and each of said first and second configurations describing a size and a quantity of corresponding ones of said first apertures and said second apertures;
- a first stop extending from a surface of said movable element proximate said first end;
- a second stop extending from said surface of said movable element proximate said second end, and each of said first and second stops is displaced a substantially equivalent distance from said rotational axis; and
- at least one electrode positioned on said substrate facing said first and second sections of said movable element.

14. A sensor as claimed in claim 13 wherein said at least one electrode comprises:
- a first electrode facing said first section, said first electrode having third apertures arranged in said second configuration and opposing said first apertures; and
- a second electrode facing said second section, said second electrode having fourth apertures arranged in said first configuration and opposing said second apertures.

15. A sensor as claimed in claim 13 wherein:
- said first section comprises a first proximal region located adjacent said rotational axis and a first distal region located adjacent said first end;
- said second section comprises a second proximal region located adjacent said rotational axis and a second distal region located adjacent said second end
- a first sense electrode facing said first proximal region;
- a second sense electrode facing said second proximal region, said first and second sense electrodes being substantially symmetrically arranged relative to said rotational axis;
- a first actuation electrode facing said first distal region; and
- a second actuation electrode facing said second distal region, said first and second actuation electrodes being substantially symmetrically arranged relative to said rotational axis.

16. A sensor as claimed in claim 13 wherein said at least one electrode comprises:
- a first electrode facing said first section and having a first perimeter that is approximately equivalent to a first outer perimeter of said first section, said first electrode including third apertures opposing said first apertures in said first section; and
- a second electrode facing said second section and having a second perimeter that is approximately equivalent to a second outer perimeter of said second section, said second electrode including fourth apertures opposing said second apertures in said second section.

* * * * *